(12) United States Patent
Flammia

(10) Patent No.: US 12,488,170 B1
(45) Date of Patent: Dec. 2, 2025

(54) SCALABLE NOISE METROLOGY FOR QUANTUM CIRCUITS

(71) Applicant: Amazon Technologies, Inc., Seattle, WA (US)

(72) Inventor: Steven Thomas Flammia, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1191 days.

(21) Appl. No.: 17/364,853

(22) Filed: Jun. 30, 2021

(51) Int. Cl.
 *G06F 30/36* (2020.01)
 *G06N 10/70* (2022.01)
 *G06F 119/10* (2020.01)

(52) U.S. Cl.
 CPC ............. *G06F 30/36* (2020.01); *G06N 10/70* (2022.01); *G06F 2119/10* (2020.01)

(58) Field of Classification Search
 None
 See application file for complete search history.

(56) References Cited

U.S. PATENT DOCUMENTS

| | | | | |
|---|---|---|---|---|
| 10,838,792 | B1* | 11/2020 | Wallman | G06F 17/16 |
| 11,334,693 | B1* | 5/2022 | Flammia | G06N 7/01 |
| 11,521,104 | B2* | 12/2022 | Delfosse | G06N 10/70 |
| 11,687,815 | B2* | 6/2023 | Harry Putra | G06N 5/01 706/62 |
| 11,836,573 | B2* | 12/2023 | Gottesman | G06F 17/18 |
| 12,112,240 | B2* | 10/2024 | Delfosse | G06N 10/20 |
| 12,118,435 | B2* | 10/2024 | van den Berg | G06N 10/20 |
| 2017/0308803 | A1* | 10/2017 | Wallman | G06F 11/004 |
| 2018/0349605 | A1* | 12/2018 | Wiebe | G06N 3/045 |
| 2020/0410343 | A1* | 12/2020 | Niu | G06N 10/40 |
| 2021/0264310 | A1* | 8/2021 | Gottesman | G06N 10/20 |
| 2022/0188682 | A1* | 6/2022 | van den Berg | G06N 10/20 |
| 2022/0374750 | A1* | 11/2022 | Smelyanskiy | G06N 10/70 |

OTHER PUBLICATIONS

J. M. Martinis, "Qubit metrology for building a fault-tolerant quantum computer", npj Quantum Information 1, (2015), arXiv e-print: arXiv:1510.01406, pp. 1-4.

R. Kueng et al., "Comparing experiments to the fault-tolerance threshold", Phys. Rev. Lett. 117, 170502 (2016), arXiv e-print: arXiv:1510.05653, pp. 1-18.

L. Viola, et al., "Dynamical decoupling of open quantum systems", Phys. Rev. Lett. 82, 2417 (1999), arXiv e-print: quant-ph/9809071, pp. 1-5.

(Continued)

*Primary Examiner* — Maikhanh Nguyen
(74) *Attorney, Agent, or Firm* — Alexander A. Knapp; Kowert, Hood, Munyon, Rankin & Goetzel, P.C.

(57) ABSTRACT

A method of estimating noise for individual gates of a quantum circuit uses averaged circuit eigenvalue sampling to determine an overall eigenvalue for the circuit. The circuit is sampled a sufficient number of times to fill a design matrix, wherein the design matrix allows for solving of a system of equations to determine eigenvalues for the individual gates using the averaged eigenvalue for the overall quantum circuit, the samples, and the sample results. Applying a logarithm to these relationships enables solving the system of equations using linear estimation or linear regression, in some embodiments.

20 Claims, 7 Drawing Sheets

(56) References Cited

OTHER PUBLICATIONS

D. M. Debroy et al., "Stabilizer slicing: Coherent error cancellations in LDPC codes", Phys. Rev. Lett. 121, 250502 (2018), arXiv e-print: arXiv:1810.01040, pp. 1-6.

J. Hu, et al., "Mitigating coherent noise by balancing weight—2 Z-stabilizers" (2021), arXiv e-print: arXiv:2011.00197 [quant-ph], pp. 1-27.

B. Zhang, et al., "Hidden Inverses: Coherent Error Cancellation at the Circuit Level", (2021), arXiv e-print: arXiv:2104.01119 [quant-ph], pp. 1-8.

E. Huang, et al., "Performance of quantum error correction with coherent errors", Phys. Rev. A 99, 022313 (2019), arXiv e-print: arXiv:1805.08227, pp. 1-26.

S. Beale, et al., Coherence in quantum error-correcting codes, Phys. Rev. Lett. 121, 190501 (2018), arXiv e-print: arXiv:1805.08802, pp. 1-7.

J. K. Iverson et al., "Coherence in logical quantum channels", New Journal of Physics 22, 073066 (2020), arXiv e-print: arXiv:1912.04319, pp. 1-113.

J. Emerson et al., "Scalable noise estimation with random unitary operators", J. Opt. B 7, S347 (2005), arXiv e-print: quant-ph/0503243, pp. 1-8.

E. Magesan, et al., "Efficient measurement of quantum gate error by interleaved randomized benchmarking", Phys. Rev. Lett. 109, 080505 (2012), arXiv e-print: arXiv:1203.4550, pp. 1-5.

J. M. Gambetta, et al., "Characterization of addressability by simultaneous randomized benchmarking", Phys. Rev. Lett. 109, 240504 (2012), arXiv e-print: arXiv:1204.6308, pp. 1-10.

J. Helsen, et al., "A new class of efficient randomized benchmarking protocols", npj Quantum Information 5, 71 (2019), arXiv e-print: arXiv:1806.02048, pp. 1-27.

S. Flammia et al., "Efficient estimation of Pauli channels", ACM Transactions on Quantum Computing 1, 1 (2020), arXiv e-print: arXiv:1907.12976, pp. 1-31.

L. Viola et al., "Random decoupling schemes for quantum dynamical control and error suppression", Phys. Rev. Lett. 94, 060502 (2005), arXiv e-print: quant-ph/0511120, pp. 1-9.

O. Kern, G. Alber, and D. L. Shepelyansky, "Quantum error correction of coherent errors by randomization", Euro. Phys. J. D 32, 153-156 (2005), arXiv e-print: arXiv:quant-ph/0407262, pp. 1-4.

E. Knill, "Quantum computing with realistically noisy devices", Nature 434, 39 (2005), arXiv e-print: arXiv:quant-ph/0410199, pp. 1-47.

J. J. Wallman et al., "Noise tailoring for scalable quantum computation via randomized compiling", Phys. Rev. A 94, 052325 (2016), arXiv e-print: arXiv:1512.01098, pp. 1-10.

M. Ware, et al., "Experimental demonstration of Pauli-frame randomization on a superconducting qubit" (2018), arXiv e-print: arXiv:1803.01818, pp. 1-11.

R. Harper, et al., "Efficient learning of quantum noise", Nature Physics 16, 1184-1188 (2020), arXiv e-print: arXiv:1907.13022, pp. 1-23.

R. Harper, et al., "Fast Estimation of Sparse Quantum Noise", PRX Quantum 2, 010322 (2021), arXiv e-print: arXiv:2007.07901, pp. 1-25.

S. T. Flammia et al., "Pauli error estimation via population recovery" (2021), arXiv e-print: arXiv:2105.02885, pp. 1-16.

M. R. Geller and Z. Zhou, "Efficient error models for fault-tolerant architectures and the Pauli twirling approximation", Physical Review A 88, 012314 (2013), arXiv e-print: arXiv:1305.2021, pp. 1-8.

A. Katabarwa and M. R. Geller, "Logical error rate in the Pauli twirling approximation", Scientific Reports 5, Article No. 14670 (2015), pp. 1-9.

J. Wallman, "Randomized benchmarking with gate-dependent noise", Quantum 2, 47 (2018), arXiv e-print: arXiv:1703.09835, pp. 1-17.

S. T. Merkel, E. J. Pritchett, and B. H. Fong, "Randomized Benchmarking as Convolution: Fourier Analysis of Gate Dependent Errors" (2018), arXiv e-print: arXiv:1804.05951, pp. 1-21.

S. T. Flammia and Y.-K. Liu, "Direct Fidelity Estimation from Few Pauli Measurements", Phys. Rev. Lett. 106, 230501 (2011), arXiv e-print: arXiv:1104.4695, pp. 1-9.

H. Akaike, "A new look at the statistical model identification," IEEE Transactions on Automatic Control, vol. AC-19, Ko. 6, Dec. 1974,k pp. 716-723.

T. J. Evans, R. Harper, and S. T. Flammia, "Scalable Bayesian Hamiltonian learning" (2019), arXiv e-print: arXiv:1912.07636, pp. 1-17.

H.-Y. Huang, R. Kueng, and J. Preskill, "Predicting Many Properties of a Quantum System from Very Few Measurements", Nature Physics 16, 1050-1057 (2020), arXiv e-print: arXiv:2002.08953, pp. 1-40.

H.-Y. Huang, R. Kueng, and J. Preskill, "Efficient estimation of Pauli observables by derandomization" (2021), arXiv e-print: arXiv:2103.07510, pp. 1-12.

F. Arute, et al., "Quantum supremacy using a programmable superconducting processor", Nature 574, 505 (2019), arXiv e-print: arXiv:1910.11333, pp. 1-67.

M. Yuan et al., "Model selection and estimation in regression with grouped variables", © 2006 Royal Statistical Society, J. R. Statist. Soc. B 68, Part 1, pp. 49-67 (2006).

R. Tao, et al., "Gleipnir: Toward Practical Error Analysis for Quantum Program", in Proceedings of the 42nd ACM SIGPLAN Conference on Programming Language Design and Implementation (PLDI 2021) (2021) arXiv e-print: arXiv:2104.06349, pp. 1-17.

R. Barends, et al, "Logic gates at the surface code threshold: Superconducting qubits poised for fault-tolerant quantum computing", Nature 508, 500 (2014), arXiv e-print: arXiv:1402.4848, pp. 1-15.

A. W. Cross, et al., "Scalable randomized benchmarking of non-Clifford gates", npj Quantum Information 2, 10.1038/npjqi.2016.12 (2016), arXiv e-print: arXiv:1510.02720, pp. 1-9.

A. Carignan-Dugas, et al., "Characterizing Universal Gate Sets via Dihedral Benchmarking", Phys. Rev. A 92, 060302 (2015), arXiv e-print: arXiv:1508.06312, pp. 1-5.

R. Harper et al., "Estimating the fidelity of T gates using standard interleaved randomized benchmarking", Quantum Science and Technology 2, 015008 (2017), arXiv e-print: arXiv:1608.02943, pp. 1-9.

* cited by examiner

SCALABLE NOISE METROLOGY FOR QUANTUM CIRCUITS

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g. the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g. a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a pair of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

Figure 1:
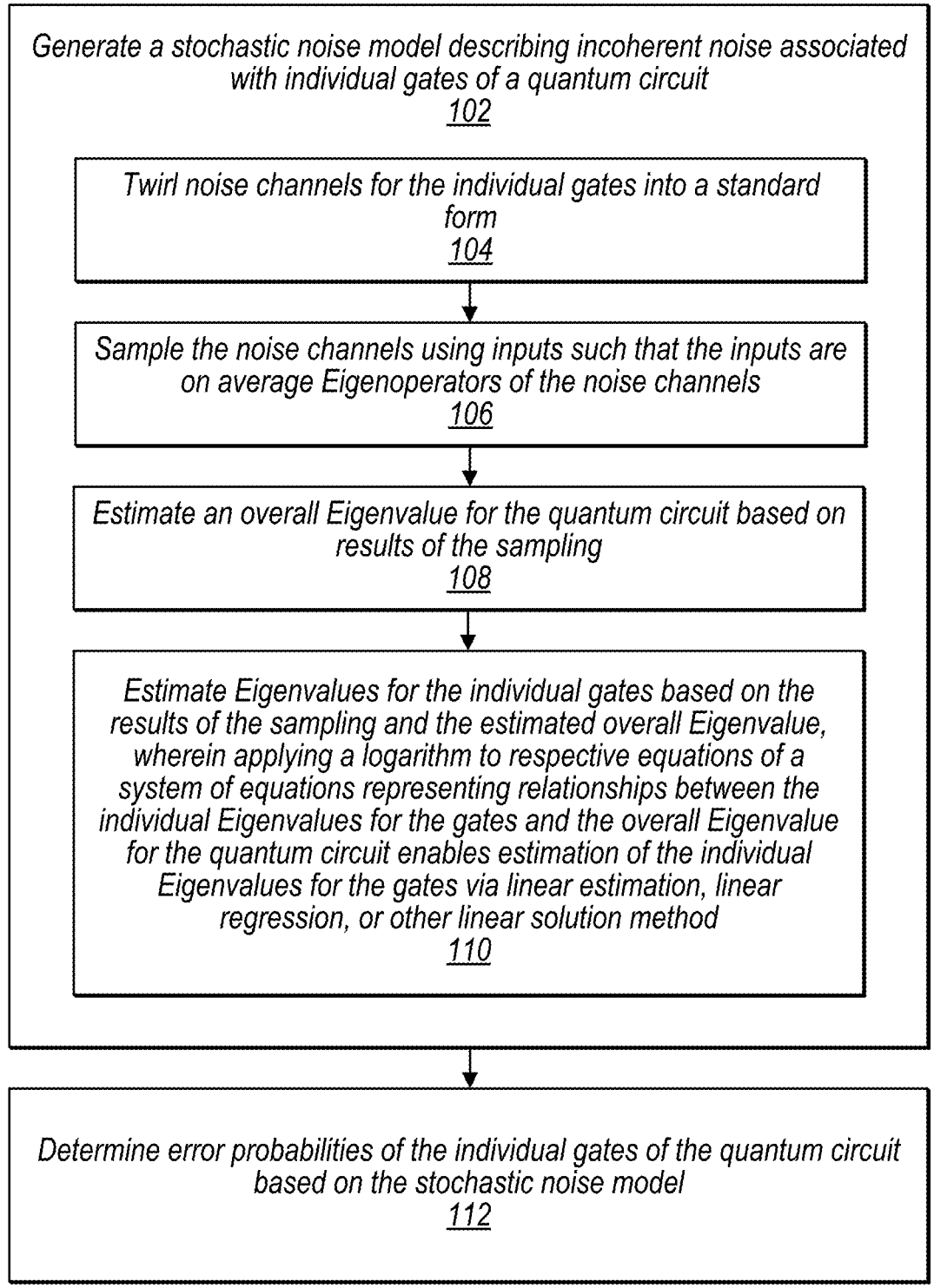
FIG. 1 illustrates a process for estimating error probabilities for individual gates of a quantum circuit using a stochastic model, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for estimating error probabilities of quantum gates of a quantum circuit in an efficient manner.

Estimating errors in quantum computers enables progress towards fault tolerant quantum computation. An error is any undesired quantum evolution, and so errors can be as general as the set of allowed quantum dynamics, making them difficult to estimate and characterize. The most relevant errors in the context of fault tolerant quantum computing (FTQC) can be broadly cast into the two archetypes of coherent and incoherent errors, though this is not an exclusive dichotomy.

Coherent errors are roughly those that can be reduced through improved calibration or eliminated via dynamical decoupling. Additionally, clever choices of quantum codes and circuits can be tailored to handle coherent noise. These methods reach natural limits when the coherent noise becomes too complex to efficiently describe. While in principle coherent errors can accumulate badly during a computation, quantum error correction itself seems to reduce the coherence of noise.

Incoherent noise, by contrast, can generally only be fixed by quantum error correction and fault tolerance. Optimizing the codes, decoders, and circuits for this requires a comprehensive understanding of the incoherent noise in a quantum device. Many techniques have been developed to estimate incoherent errors, including randomized benchmarking (RB), interleaved RB, simultaneous RB, character RB, and Pauli noise estimation among others. Each of these techniques has in common that a general quantum noise source (which may include coherent errors) is actively averaged to obtain an incoherent noise model with the same fidelity using randomized control techniques. It is this averaged noise that RB-type methods seek to estimate. These methods require a large number of samples to be captured for each quantum gate to be modeled, which is time consuming and ties up quantum resources and classical computing resources to perform. For example, in a system with 100 qubits there may be over 5,000 parameters that need to be individually sampled (repeatedly) in order to build a model using such previous techniques.

In contrast to the previous methods used to estimate noise for individual quantum gates which required repeated sampling, the procedures described herein enable a linear equation to be generated for each sample run that is completed. Thus, it is only necessary to sample the system a number of times approximately equal to a number of gates for which noise is to be modeled. As a simplified example, 5 sample runs can be used to generate a system of 5 equations that then enables solving for 5 variables, where the five variables are Eigenstates for respective Eigen operators associated with (for example five) gates of the quantum circuit. These determined Eigenvlaues can then be used to determine error rates for the (for example five) gates of the quantum circuit.

An overall Eigenvalue for the quantum circuit can be determined based on an average of the samples. Also, because the overall Eigenvalue for a quantum circuit is a product of the Eigenvalues of the respective quantum gates of the quantum circuit, an equation can be written for each sample with the Eigenvalues of the individual gates represented as variables in the equation to be solved for. By generating enough sample results (e.g. equations) a sufficient number of equations corresponding to the number of variables to be solved for can be generated. Also, applying a logarithm enables the system of equations to be solved using a linear estimation or other linear system of equations solution.

FIG. 1 illustrates a process for estimating error probabilities for individual gates of a quantum circuit using a stochastic model, according to some embodiments.

At block, 102 a stochastic model is generated for a quantum circuit comprising a plurality of quantum gates. The stochastic model describes incoherent noise associated with the individual gates of the quantum circuit.

In order to generate the stochastic model, at block 104, noise channels for the individual gates of the quantum circuit are twirled into a standard form such that the quantum gates are limited in that the quantum gates are primarily subject to only noise which is in a noise channel for the respective quantum gates. At block 106, the noise channels are sampled using inputs that have a property such that the respective inputs are on average Eigen-operators of the noise channels for the respective quantum gates.

At block 108, an estimate for an overall eigenvalue for the quantum circuit (comprising the individual quantum gates) is determined based on the results of the sampling performed at block 106.

At block 110, eigenvalues for the individual gates are estimated based on the results of the sampling performed at block 106 and the estimated overall eigenvalue determined at block 108, wherein applying a logarithm to respective equations of a system of equations representing relationships between the individual eigenvalues for the individual quantum gates and the overall eigenvalue for the quantum circuit enables estimation of the individual eigenvalues for the individual quantum gates using linear estimation, linear regression, or other linear solution method.

At block 112, error probabilities and/or error rates of the individual gates are determined based on the stochastic model generated at block 102. In some embodiments, a Walsh transform is applied to the results determined at block 110 to generate the stochastic model.

Figure 2:
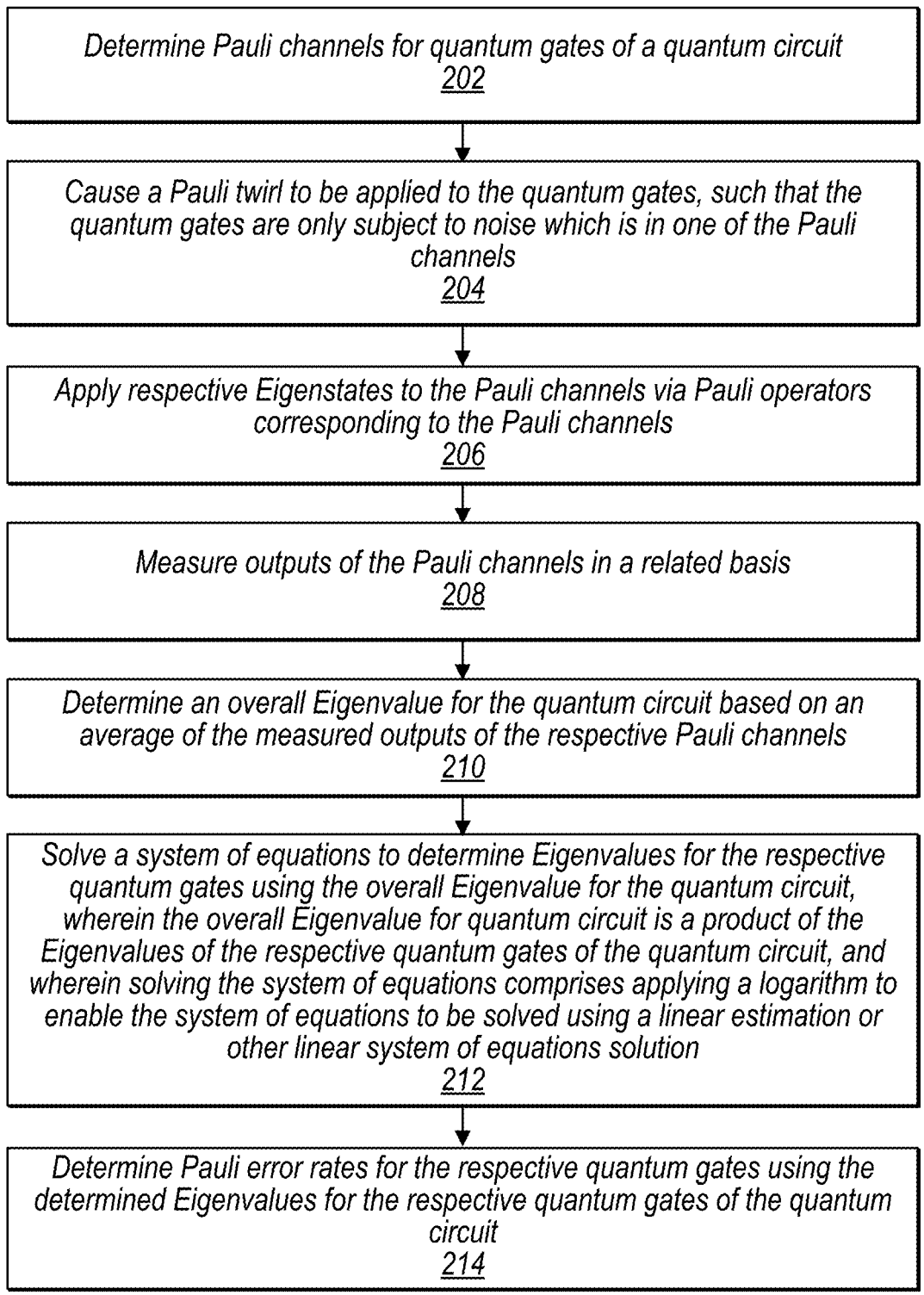
FIG. 2 illustrates a more detailed process for estimating Pauli error probabilities for individual gates of a quantum circuit using a stochastic model, according to some embodiments.

FIG. 2 illustrates a more detailed process for estimating Pauli error probabilities for individual gates of a quantum circuit using a stochastic model, according to some embodiments.

In some embodiments, the method described in FIG. 1 may be performed in a manner as described in FIG. 2 to determine Pauli error probabilities.

At block 202, Pauli channels for a stochastic model are determined for gates of a quantum circuit. In some embodiments, the Pauli channels may take into account space correlated errors between gates, time-correlated errors between gates, and/or space and time correlated errors between gates. Also, in some embodiments, the determined Pauli channels may take into account state preparation errors and measurement errors (SPAM). In some embodiments, multiple different models may be generated using different Pauli channels to describe error behavior of a same quantum circuit according to different hypothesis, such as correlations of errors across space and time.

At block 204, a Pauli twirl (as described in more detail below) is applied to the quantum gates such that the quantum gates are only subject to noise which is in one of the Pauli channels.

At block 206, respective eigenstates are applied to the Pauli channels, wherein the eigenstates have eigenvalues of +1 or −1. The respective eigenstates are applied to the Pauli channels corresponding to the respective quantum gates via Pauli operators ($P_a$) of selected ones of the Pauli channels corresponding to the respective quantum gates. Then, at block 208, outputs of the Pauli channels are measured in a basis state $P_{a1}$.

At block 210, an overall eigenvalue for the quantum circuit is determined (e.g. estimated) based on an average of the measured outputs of the respective Pauli channels. At block 212, a system of equations is solved to determine (e.g.

estimate) eigenvalues for the respective quantum gates. The equations that are solved are generated using the determined overall eigenvalue for the quantum circuit and the measured outputs, wherein the overall eigenvalue for the quantum circuit is a product of the eigenvalues of the respective quantum gates of the quantum circuit. Solving the system of equations comprises applying a logarithm to enable the system of equations to be solved using a linear estimation or other linear system of equations solution.

At block 214, Pauli error rates are determined for the respective quantum gates of the quantum circuit using the determined eigenvalues for the respective quantum gates of the quantum circuit.

Figure 3:
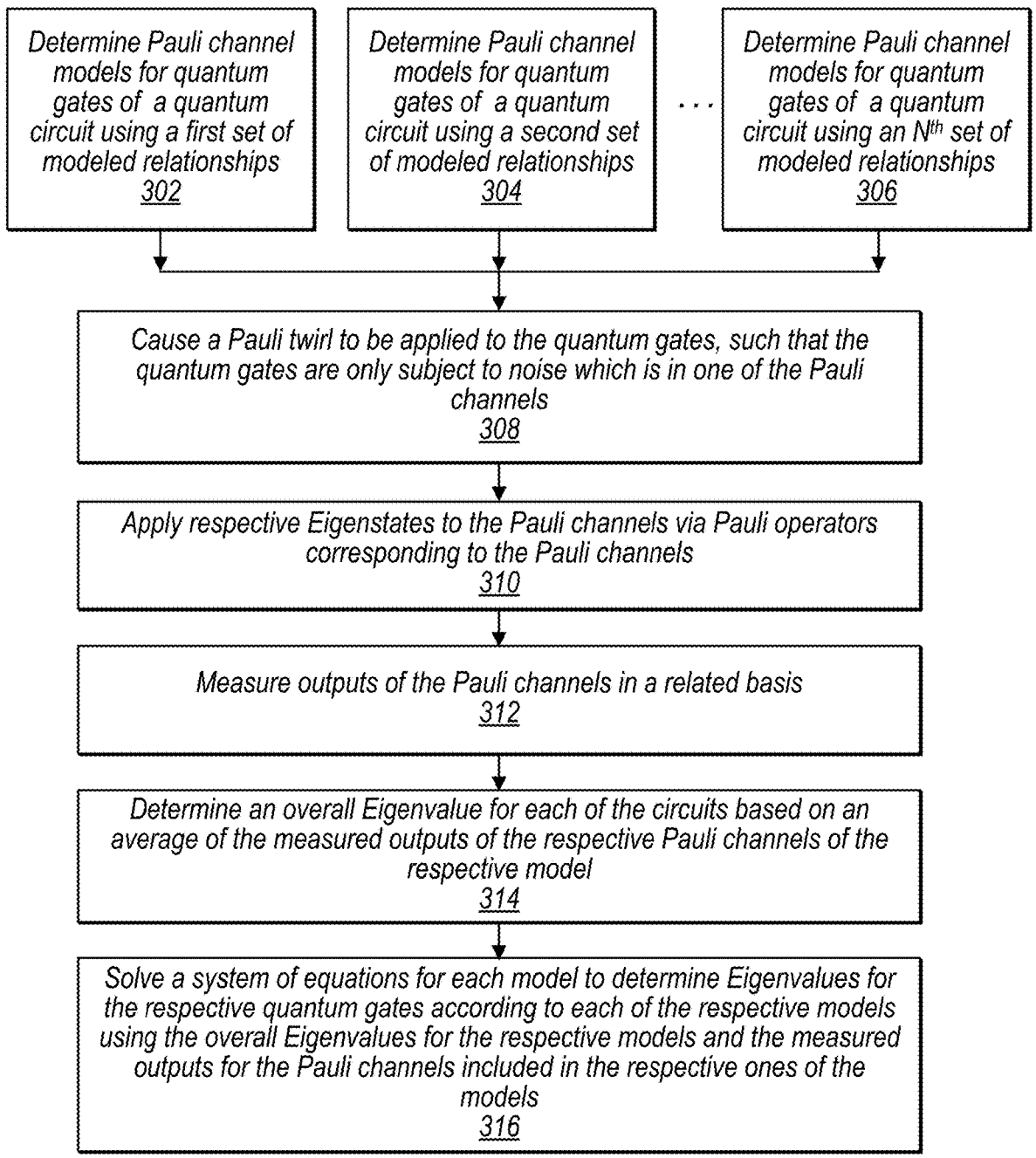
FIG. 3 illustrates a process for generating, in parallel, a plurality of stochastic models for estimating Pauli error rates, according to some embodiments.

FIG. 3 illustrates a process for generating, in parallel, a plurality of stochastic models for estimating Pauli error rates, according to some embodiments.

In some embodiments, multiple models may be generated using at least partially shared samples. For example, in FIG. 3 multiple different sets of Pauli channel models are determined for different models of the quantum circuit at blocks 302, 304, and 306. Note that the different models may represent a same physical quantum circuit, but may make different assumptions about how the quantum circuit behaves. For example, a first model may assume that there is minimal stochastic noise interactions between gates, whereas another model may assume there is a more significant effect due to stochastic noise interactions between gates. Thus, the first model may include Pauli channels for each gate, while the second model may include Pauli channels for each gate and additional Pauli channels that represent interactions between gates.

At block 308, a Pauli twirl is applied to the gates of the quantum circuit that are to be modeled via the multiple models of blocks 302, 304, and 306. At block 310 respective eigenstates are applied to Pauli channels of the quantum circuit via Pauli operators corresponding to the Pauli channels. At block 312 outputs of the Pauli channels are measured in a related basis.

At block 314 an overall eigenvalue is determined for each of the circuits (e.g. each sample run) and at block 316 separate systems of equations for each of the models are solved to determine eigenvalues for the respective gates according to the different models. In some embodiments, the different circuits for which overall eigenvalues are determined may be circuits according to the Pauli channel models determined at 302, 304, and 306 to model an actual quantum circuit. However, the actual physical quantum circuit may be the same, but may just be modeled as different circuits. Also, the measured outputs (e.g. samples) can be re-used (without having to repeat the samples) in the system of equations for the different models. However, if a model includes for example, 3 unknowns to be solved for, 3 samples are needed. If another model includes, for example, 5 unknowns to be solved for, 5 samples are needed. But, instead of having to collect 8 samples total for both models, the 3 samples of the first model may also be used to solve the second model along with 2 additional samples, so that there are enough equations in the system of equations to solve for the 5 unknowns of the second model. These determined eigenvalues may then be used to determine error probabilities or error rates of the respective gates (or gate interactions) for each of the models. For example, if three models are being generated, three sets of error probabilities may be generated for each gate (each of the three probabilities corresponding to a given one of the models determined at blocks 302, 304, and 306).

In some embodiments, the models may not be determined prior to gathering the samples at blocks 310 and 312. For example, in some embodiments blocks 302, 304, and 306 may be performed between block 314 and 316. The only condition being that a sufficient number of samples are collected at blocks 310-314 and a sufficient number of overall eigenvalues are determined such that there are enough equations to solve for the number of unknowns included in the equations of the selected model or models. Additionally, in some embodiments, blocks 310-314 may be performed iteratively. For example a sufficient number of samples to solve for unknowns according to a first model may be performed. Then, the model accuracy may be evaluated, and if it is determined that a different model should be tested, additional samples can be collected to allow for solving for additional numbers of unknowns if the different model includes more variables than the first model that was considered. However, the samples used when generating the first model may be re-used when generating the second model.

Figure 4:
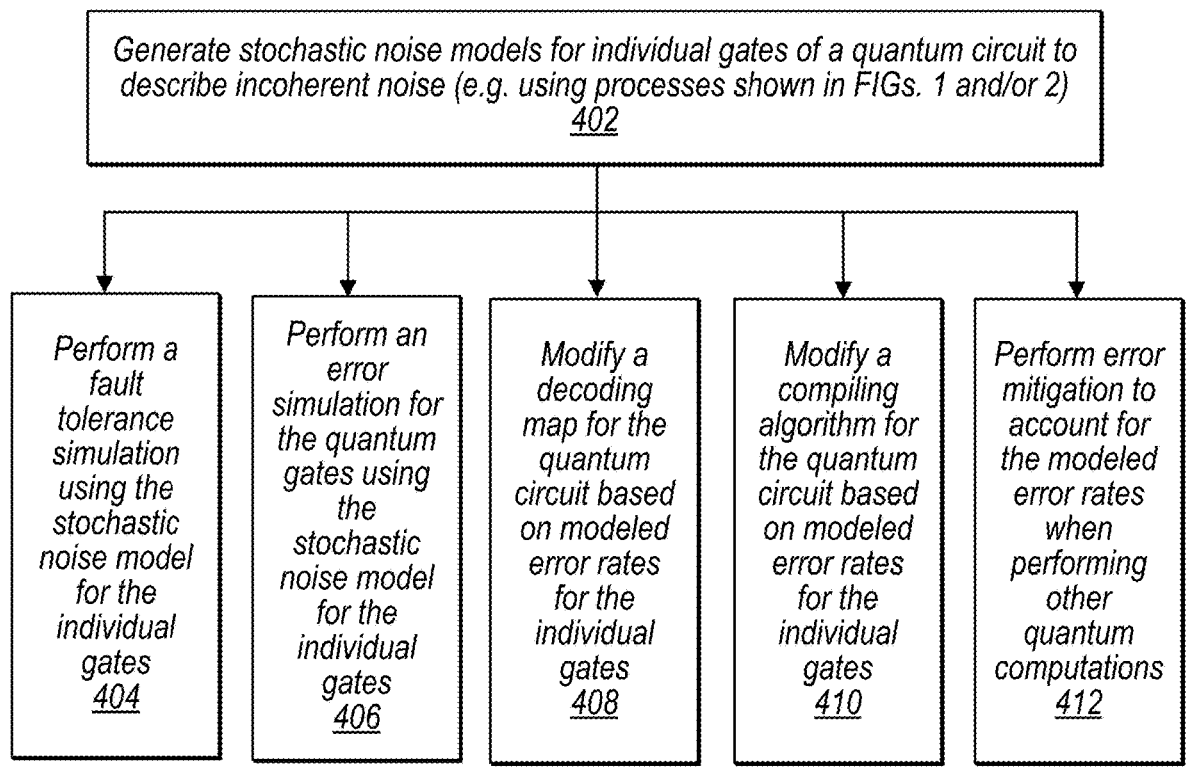
FIG. 4 illustrates example processes for reducing error in a quantum circuit, or improving interpretation of measurements of the quantum circuit to reduce error based on estimated error rates/error probabilities of respective individual gates of the quantum circuit, according to some embodiments.

FIG. 4 illustrates example processes for reducing error in a quantum circuit, or improving interpretation of measurements of the quantum circuit to reduce error based on estimated error rates/error probabilities of respective individual gates of the quantum circuit, according to some embodiments.

At block 402, a stochastic model is generated for individual gates of a quantum circuit, for example using any of the methods as described herein, such as in FIGS. 1-3.

In some embodiments, at block 404, a fault tolerance simulation is performed using the stochastic noise model for the individual gates.

In some embodiments, at block 406, an error simulation for the quantum gates is performed using the stochastic noise model for the individual gates.

In some embodiments, at block 408, a decoding map for the quantum circuit is modified based on modeled error rates for the individual gates as determined at block 402.

In some embodiments, at block 410, a compiling algorithm for the quantum circuit is modified based on modeled error rates for the individual gates as determined at block 402. For example, the compiling algorithm may be modified to avoid or diminish effects of gates estimated to have high error probabilities and/or high error rates.

In some embodiments, at block 412, the determined error rates are accounted for when performing other quantum computations to perform an error mitigation using the determined modeled error rates for the gates of the quantum circuit.

More Detailed Discussion

The following discussion focuses on Clifford circuits, though it is noted that error rates for some non-Clifford gates can also be estimated using the approach described herein.

Averaged circuit eigenvalue sampling (ACES) allows for incoherent noise, modeled as a Pauli channel, to be learned extremely efficiently. ACES goes beyond modelling state preparation and measurement (SPAM) errors using Pauli channels and allows for simultaneously estimating a large collection of Pauli noise channels associated with a quantum device. Indeed, numerical simulations show that ACES can characterize every error rate associated to the Clifford gates in a 100 qubit quantum device using fewer than 20 circuits and a reasonable number of samples, in some example embodiments.

Pauli and Clifford Groups

The n-qubit Pauli group $P_n$ includes n-fold tensor products of single-qubit Pauli operators labeled as follows. Let a be a 2n-bit string $a=a_1 a_2 \ldots a_{2n}$ and write $P_a = i^{a^T \gamma a} \Pi_{j=1}^n X_j^{a_{2j-1}} Z_j^{a_{2j}}$, where $X_j$ and $Z_j$ are single-qubit Paulis acting on qubit j, and $$Y = \bigotimes_{k=1}^n \begin{pmatrix} 0 & 1 \\ 0 & 0 \end{pmatrix}$$

is such that $P_a$ is always Hermitian. The group $P_n$ includes these $P_a$, together with the overall phases $\{\pm 1, \pm i\}$, composed under matrix multiplication. Two elements of the Pauli group either commute or anti-commute, with the sign given by $$P_a P_b = (-1)^{\langle a,b \rangle} P_b P_a \tag{1}$$

where the sign is in terms of the binary symplectic form $\langle a, b \rangle = a^T (\gamma + \gamma^T) b \mod 2$.

The normalizer of the Pauli group inside the unitary group, modulo phases, is the Clifford group $C_n$, and it is generated by the controlled-NOT gate $CX_{i \to j}$ from control i to target j, the Hadamard gate $H_j$, and the phase gate $S_j$.

Pauli channels are quantum channels of the form $$\rho \to \Sigma_a p_a P_a \rho P_a^\dagger \tag{2}$$

where $\rho_a$ is a (possibly sub-normalized) probability distribution called the Pauli error rates. Leakage from the qubit space occurs when $\Sigma_a p_a < 1$. When a general quantum channel $\varepsilon = \Sigma_j K_j \cdot K_j^\dagger$ is twirled by the Pauli group, it becomes a Pauli channel denoted $\varepsilon^P$, $$\varepsilon^P(\rho) = \frac{1}{4^n} \sum_a P_a^\dagger \varepsilon(P_a \rho P_a^\dagger) P_a \tag{3}$$

If $K_j = \Sigma_a v_{j,a} P_a$, then the Pauli error rates of $\varepsilon^P$ are $p_a = \Sigma_j |v_{j,a}|^2$. Thus the Pauli error rates of a general channel are spoken of by considering its Pauli twirl. Note that twirling can be interpreted as the mean of a random process where a Pauli is selected uniformly at random and applied both before and after the channel.

The eigenvectors of a Pauli channel E are just the Pauli operators. Indeed, from equation 1 it can be seen that $\varepsilon(P_b) = \lambda_b P_b$ where the Pauli eigenvalues $\lambda_b$ are, $$\lambda_b = \Sigma_a (-1)^{\langle a,b \rangle} p_a. \tag{4}$$

This equation can be inverted to express the error rates in terms of the eigenvalues, $$p_a = \frac{1}{2^n} \sum_b (-1)^{\langle a,p \rangle} \lambda_b. \tag{5}$$

Now consider a "G-twisted" Pauli twirl. For a given Clifford G and Pauli $P_a$ let $P_{a'} = G(P_a)$. Note that since G is unitary, the set of all a and a' are in one-to-one correspondence. A noisy gate can then be expanded as $\tilde{G} = G\varepsilon$ for some general noise channel $\varepsilon = G^\dagger \tilde{G}$. Intuitively, $\varepsilon$ is close to the identity, though the definition doesn't assume that. Then the G-twisted twirl of $\tilde{G}$ is $$\tilde{G}^{GP}(\rho) = \frac{1}{4^n} \sum_a P_a^\dagger \tilde{G}(P_a \rho P_a^\dagger) P_{a'} = G(\varepsilon^P(\rho)). \tag{6}$$

From the last equality, it can be seen that the G-twisted twirl isolates the Pauli noise around a given noisy implementation $\tilde{G}$ of an ideal Clifford gate G.

G-twisted twirled channels have an analogous eigendecomposition to a Pauli twirled channel, but with the notion of a generalized eigenvector. Given such a channel $\tilde{G}^{GP}$, the generalized eigenvectors with respect to $G_0$ are vectors such that $\tilde{G}^{GP}(v) \lambda G_0(v)$. It can be seen from equation 6 that choosing $G_0 = G$ gives exactly the Paulis as the generalized eigenvectors with eigenvalues given by the Pauli eigenvalues of the noise map $\varepsilon^P$.

Averaged Circuits

Now consider a Clifford circuit (e.g. a circuit composed solely of CX, H, and S gates or an equivalent generating set), denoted C. Any physical implementation of these circuits will be noisy, and it is desired to characterize the incoherent Pauli-averaged noise in these circuits, specifically in the generators used to create the circuits. To that end, from the circuit C a new ensemble of circuits $\mathcal{C}^P$ can be created by sampling a G-twisted Pauli twirl across each Clifford circuit element and recompiling the Pauli gate. Each element of this ideal ensemble implements the same unitary operation. However, the noisy gates inside the physically implemented circuit ensemble are now, on average, subject only to noise which is a Pauli channel. More specifically, if the original circuit C ideally consists of the product of Clifford gates $G_T \ldots G_2 G_1$, then the averaged circuit is $G_T^P \ldots G_2^P G_1^P$.

A noisy implementation with noisy gates $\tilde{G}_j$ would be expected have gates $\tilde{G}_j^P = G_j \varepsilon_j$ for some Pauli noise channel $\varepsilon_j$ that depends on the gate $G_j$ and is (in the regime of interest) close to the identity channel.

This result rigorously holds whenever the noise on the gate $\tilde{G}_j$ is independent of which Pauli frame it is implemented in, an assumption known as gate-independent noise. While the gate-independent noise assumption may seem unrealistic, it should be noted that in standard randomized benchmarking the much stronger assumption is made that the noise is gate-independent across all Clifford gates. Thus, this assumption is weakened substantially to just the Pauli gates, and it is likely that the assumption can be further relaxed to allow weak gate dependence.

Eigenvalue Sampling

Suppose a given circuit C ideally implements the identity unitary. Under the gate-independent noise assumption, it follows that the noisy implementation of the averaged circuit, $\tilde{\mathcal{C}}^P(P_a) = \Lambda \mathcal{C}_{,a} P_a$ where capital $\Lambda$ is used to denote the circuit level eigenvalue (e.g. overall eigenvalue). Because of the gate-independent noise assumption, this eigenvalue depends only on the eigenvector ($P_a$) and on the circuit (C), so it is labeled accordingly as $\Lambda \mathcal{C}_{,a}$.

If the circuit C does not implement the identity unitary, but rather some net Clifford operation, something similar still holds. If the ideal circuit maps an input Pauli $P_a$ to an output Pauli $C(P_a) = \pm P_{a'}$, then the overall $\pm$sign and the value of a' can be efficiently computed using the Gottesman-Knill theorem. Note that if the circuit C implements a non-entangling unitary, then a single-qubit Pauli will be mapped again to a single-qubit Pauli. The noisy version of the circuit will give an averaged operator that satisfies the generalized eigenvalue equation $$\tilde{\mathcal{C}}^P(P_a) = \Lambda \mathcal{C}_{,a} \mathcal{C}(P_a) = \pm \Lambda \mathcal{C}_{,a} P_{a'}. \tag{7}$$

From the orthogonality of the Pauli basis, it follows that $$\Lambda \mathcal{C}_{,a} = \pm Tr(P_{a'} \tilde{\mathcal{C}}^P(P_a)), \tag{8}$$

and this suggests a prescription for estimating the (generalized) eigenvalue $\Lambda \mathcal{C}_{,a}$, which is referred to herein as eigenvalue sampling.

To estimate $\Lambda \mathcal{C}_{,a}$ via eigenvalue sampling, first focus on the case where $P_a$ is a single-qubit Pauli. The process can be begun by selecting uniformly at random an eigenstate $\psi\pm$ on the support of $P_a$ having eigenvalue $\pm 1$ (ignoring the other registers). Then $\Psi\pm$ can be sent into a randomly chosen element in the circuit ensemble $\mathcal{C}^P$ and measure the output in the basis defined by $P_{a'}$, paying attention only to the output register in the support of $P_{a'}$. The overall estimate for $\Lambda\mathcal{C}_{,a}$ is then the sample average of N independent repeated experiments, with the signs from the runs with $\Psi+$ and $\Psi-$ differenced so that equation 8 holds in expectation.

If the input Pauli acts on multiple qubits, then by appropriate sign choices it is possible to simultaneously sample all of the constituent single-qubit Paulis' circuit eigenvalues by preparing tensor product input states and making product basis measurements. This is due to the convenient restriction of unitaries in $S_n \times C_1^{\otimes n}$. This strategy makes efficient use of the natural n-bit measurements in the system. Furthermore, in the regime of interest where the circuit noise is small, the measurements are nearly deterministic, making sampling very efficient as well.

Relating Circuit and Gate Eigenvalues

It has been shown that eigenvalue sampling on averaged circuits gives access to the (generalized) Pauli eigenvalues $\Lambda\mathcal{C}_{,a}$ in the implemented circuit ensemble $\tilde{\mathcal{C}}^P$. This is a useful method for estimating the quality of the circuit implementation $\tilde{\mathcal{C}}$, since it can be interpreted as a fidelity-like measure for how faithfully the circuit executes given the input $P_a$. However, characterization of not just the global circuit noise, but the error rates associated to the constituent gates as well is desired.

Since a Clifford gate is a special case of a Clifford circuit, equation 7 can be applied to each gate individually to obtain $\tilde{G}_1^P(P_{a1}) = \lambda_{1,a1} G_1(P_{a1}) = (\pm)_1 \lambda_{1,a1} P_{a2}$. Acting on this with $\tilde{G}_2^P$, the following is obtained $$\tilde{G}_2^P \tilde{G}_1^P (P_{a1}) = (\pm)_1 (\pm)_2 \lambda_{1,a1} \lambda_{2,a2} G_2^P(P_{a2}) = (\pm)_1 (\pm)_2 \lambda_{1,a1} \lambda_{2,a2} P_{a3}$$

Continuing in this fashion it is found that $$\tilde{\mathcal{C}}^P(P_{a0}) = (\pm)\Pi_{k=1}^T \lambda_{k,a_k} \mathcal{C}(P_{a0}), \quad (9)$$

where the overall sign and the individual $a_k$ can be computed efficiently via the Gottesman-Knill theorem. Comparing with equation 7 it is seen that $\Lambda\mathcal{C}_{,a} = \pm\Pi_k \lambda_{k,a_k}$. Using the freedom to reinterpret the sign of the input Pauli $P_{a_1}$ to ensure that there is always a ± gives the relation $$\Lambda\mathcal{C}_{,a_1} = \Pi_{k=1}^T \lambda_{k,a_k}. \quad (10)$$

With this sign convention, in the regime of interest $\Lambda\mathcal{C}_{,a_1}$ is positive and not too small. It is therefore possible to focus on sets of circuits $C_k$ and input labels $a_{k_j}$ such that $\Lambda\mathcal{C}_{k,a_k}$ is always larger than, say, ½, and gates where $\lambda_{k,a_k} > 0$.

Estimating Gate Errors Via Averaged Circuit Eigenvalue Sampling

Now consider a circuit $C_k$ and an input label $a_{k_j}$. Give this combination a composite index $\mu=(C_k, a_{k_j})$. From the above discussion an empirical stimate $\hat{\ }_\mu$ of $\Lambda_\mu$ can be obtained via eigenvalue sampling on the averaged circuit ensemble for the circuit/input label $\mu$. Similarly, it is possible to assemble all gate-level eigenvalues under a single index, $\lambda_\nu$. Since all eigenvalue quantities are positive in the regime of interest, new variables can be introduced, $$\Lambda_\mu = e^{-b_\mu}, \lambda_\nu = e^{-x_\nu}. \quad (11)$$

The new variables are related by the linear equations $$\Sigma_\nu A_{\mu\nu} x_\nu = b_\mu. \quad (12)$$

The matrix A is referred to as the design matrix. Once enough independent equations (μ) are obtained so that A is full rank, an estimate for x can be obtained in a number of ways, most straightforwardly via least squares as $\hat{x} = A^+ \hat{b}$, where $\hat{b}$ denotes an empirical estimate for b and $A^+$ is the pseudoinverse of A. Inverting equation 11 subsequently gives estimates for $\lambda_\nu$, and Pauli error rates can be obtained by using equation 5.

The precision of the estimate depends in part on the choice of A, as well as the precision of the initial estimates of the $\Lambda_\mu$. The estimates for $\lambda_\nu$ are always accurate in the sense that these are consistent estimators, however they will in general have some bias.

Correlations and State Preparation and Measurement Errors (SPAM)

The averaged circuit eigenvalue sampling (ACES) methodology is flexible enough to allow independent estimation of state preparation and measurement errors (SPAM errors) as well as space- and/or time-correlated errors. To handle SPAM, a list of variables $x_\nu$ associated to each Pauli preparation error that that are desired to be modeled are added. To handle space-correlated errors, the gates $G_j$ that generate the circuits are re-interpreted to come in correlated groups. For example, if it is desired to model correlated noise between the Hadamard gates $H_1$ and $H_2$, there could be separate variables for the gates $H_1$, $H_2$, and $H_1 \otimes H_2$. Time-correlated errors would similarly require introducing variables for pairs of gates in time. For example, if the noise on $H_1$ depends on whether $S_1$ was applied or not right before, then separate variables may be introduced for these cases. Thus the models, may be adapted to account for space correlated errors (e.g. errors that have a correlation between qubits or gates in a given time step), time-correlated errors (e.g. errors that propagate across more than one time step), or both, e.g. space-time correlated errors, wherein an error propagates in both space (e.g. to other qubits) and in time (e.g. across time steps).

The only condition for a consistent estimate in all of these scenarios is that the design matrix A is full rank. If A were random, then we only need as many equations as unknowns for this to hold with high probability. From this heuristic, it is expected that the number of experiments should be about as large as, or a little larger than, the number of variables.

In the simplest possible model of noise, there are only O(n) variables: CX gates acting between O(1) neighbors, together with H gates, S gates, and SPAM on each qubit. In the more complicated models above, the number of parameters can grow rapidly, and there is a risk of overfitting.

Fortunately, multiple hypotheses can be tested on the same data set using ideas from model selection such as the Akaike information criterion. Of course, more complicated models will typically take more data and more experiments to reliably estimate.

Figures 5A, 5B, 5C:
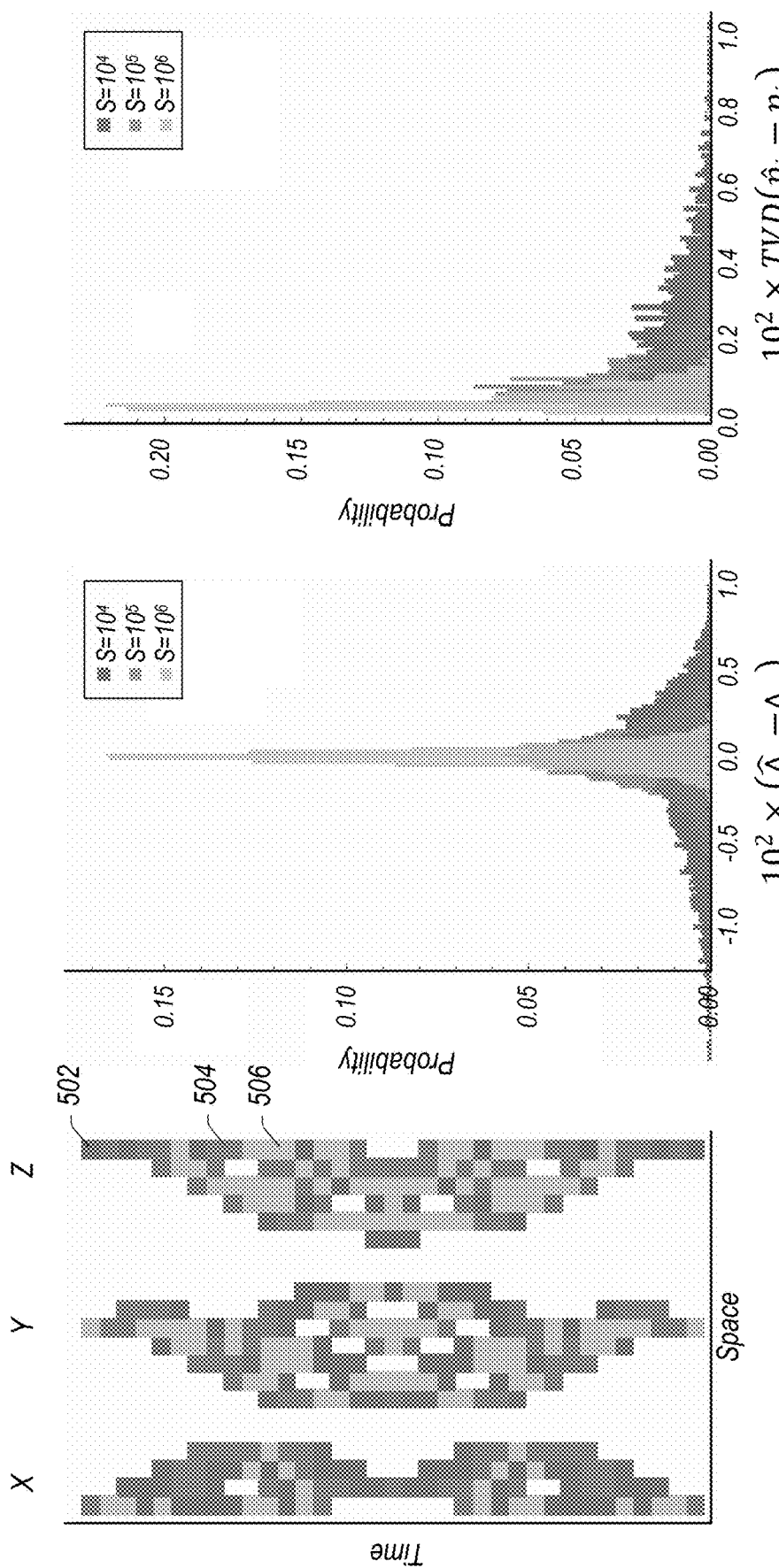
FIG. 5A is a graph illustrating propagation of a Pauli Eigenstate through a small mirror circuit, according to some embodiments.
FIG. 5B illustrates a probability distribution for absolute error in an estimated overall Eigenvalue for the quantum circuit of FIG. 5A, wherein the overall Eigenvalue is determined using the procedures described herein, according to some embodiments.
FIG. 5C illustrates total variation distances for estimated Pauli error rates of individual gates (determined according to the procedures described herein) as compared to the actual Pauli error rates of the individual gates, according to some embodiments.

FIGS. 5A-5C illustrate example results using averaged circuit eigenvalue sampling, according to some embodiments.

For example, FIG. 5A illustrates sending X, Y, and Z Paulis (medium grey (504), light grey (506), and dark grey (502), respectively.) through a small mirror circuit with n=21 qubits, depth d=34, and nearest-neighbor gates in 1D. The trajectory of a single-qubit Pauli eigenstate through a sufficiently deep random mirror circuit will touch many different gates, but will still give deterministic measurement results for single-qubit Pauli measurements.

FIG. 5B are normalized histograms corresponding to estimated errors for the experiment shown in FIG. 5A. FIG. 5B shows the absolute error for the μth estimated circuit eigenvalue $\hat{\Lambda}_\mu$.

FIG. 5C shows the total variation distance (TVD) for the estimated Pauli error rates $\hat{p}_j$ of the noisy gate $\hat{G}_j$ in a n=100 qubit simulation. There are 898 gates (including measurements) in the model, and 10,155 estimated circuit fidelities (which are estimated in large batches due to the n-bit measurements) to estimate 5070 parameters. Plots are for a number of samples S per $\Lambda_\mu$ of $10^4$; $10^5$, and $10^6$.

Example Quantum Computing Service

Quantum computers may be difficult and costly to construct and operate. Also, there are varying quantum computing technologies under development with no clear trend as to which of the developing quantum computing technologies may gain prominence. Thus, potential users of quantum computers may be hesitant to invest in building or acquiring a particular type of quantum computer, as other quantum computing technologies may eclipse a selected quantum computing technology that a potential quantum computer user may invest in. Also, successfully using quantum computers to solve practical problems may require significant trial and error and/or otherwise require significant expertise in using quantum computers.

As an alternative to building and maintaining a quantum computer, potential users of quantum computers may instead prefer to rely on a quantum computing service to provide access to quantum computers. Also, in some embodiments, a quantum computing service, as described herein, may enable potential users of quantum computers to access quantum computers based on multiple different quantum computing technologies and/or paradigms, without the cost and resources required to build or manage such quantum computers. Also, in some embodiments, a quantum computing service, as described herein, may provide various services that simplify the experience of using a quantum computer such that potential quantum computer users lacking deep experience or knowledge of quantum mechanics, may, never the less, utilize quantum computing services to solve problems.

Also, in some embodiments, a quantum computing service, as described herein, may be used to supplement other services offered by a service provider network. For example, a quantum computing service may interact with a classical computing service to execute hybrid algorithms. In some embodiments, a quantum computing service may allow a classical computer to be accelerated by sending particular tasks to a quantum computer for execution, and then further performing additional classical compute operations using the results of the execution of a quantum computing object on the quantum computer. For example, a quantum computing service may allow for the acceleration of virtual machines implemented on classical hardware in a similar manner as a graphics processing unit (GPU) may accelerate graphical operations that otherwise would be performed on a central processing unit (CPU).

In some embodiments, a quantum computing service may provide potential quantum computer users with access to quantum computers using various quantum computing technologies, such as quantum annealers, ion trap machines, superconducting machines, photonic devices, etc. In some embodiments, a quantum computing service may provide customers with access to at least three broad categories of quantum computers including quantum annealers, circuit-based quantum computers, and analog or continuous variable quantum computers. As used herein, these three broad categories may be referred to as quantum computing paradigms.

In some embodiments, a quantum computing service may be configured to provide simulation services using classical hardware based computing instances to simulate execution of a quantum circuit on a quantum computer. In some embodiments, a quantum computing service may be configured to perform general simulation and/or simulation that specifically simulates execution of a quantum circuit on a particular type of quantum computer of a particular quantum computer technology type or paradigm type. More specifically, in some embodiments, a quantum computing service may enable a customer to estimate error probabilities of gates included in a submitted quantum circuit or other quantum circuit to be compiled using the stochastic noise estimation procedures described above. In some embodiments, simulation may be fully managed by a quantum computing service on behalf of a customer of the quantum computing service. For example, the quantum computing service may reserve sufficient computing capacity on a virtualized computing service of the service provider network to perform simulation without customer involvement in the details of managing the resources for the simulator. Also, in some embodiments, a quantum computing service may maintain one or more "warm" simulators. The "warm" simulators may include simulators that are pre-configured on compute instances of a virtualized computing service and are already instantiated such that the simulators are ready to perform simulation on behalf of quantum computing service customers on demand.

In some embodiments, a quantum computing service may include a dedicated console that provides customers access to multiple quantum computing technologies. Furthermore, the quantum computing service may provide a quantum algorithm development kit that enables customers with varying levels of familiarity with quantum circuit design to design and execute quantum circuits. In some embodiments, a console of a quantum computing service may include various application programmatic interfaces (APIs), such as:
- (Create/Delete/Update/Get/List)Simulator-Configuration—create, read, update, and delete (CRUD) operations for simulator configuration objects.
- (Start/Cancel/Describe)Simulator—used to control each of the user-defined simulator instances.
- (List/Describe) quantum processor units (QPUs)—retrieves quantum computer hardware information.
- (Create/Cancel/List/Describe)Task—used to manage the lifecycle of individual quantum tasks/quantum objects.

In some embodiments, a quantum algorithm development kit may include a graphical user interface, APIs or other interface to allow customers of a quantum computing service to define quantum objects, such as quantum tasks, algorithms or circuits, using the quantum algorithm development kit. In the some embodiments, the quantum algorithm development kit may include an interface option that enables customers to share the quantum objects with other customers of the quantum computing service. For example, the quantum algorithm development kit may include a marketplace that allows customers to share or sell particular quantum objects with other customers.

In some embodiments, a quantum computing service may include a public application programmatic interface (API) that accepts quantum objects submitted by a customer of the quantum computing service. Additionally, the quantum computing service may include a back-end API transport that is non-public. The back-end API transport may enable quantum circuits to be transported from a centralized location that implements the quantum computing service, such as one or more data centers of a service provider network, to an edge computing device at a particular quantum hardware provider location where the quantum circuit is to be executed.

In some embodiments, results of the execution of a quantum circuit on a quantum computer at a quantum hardware provider location may be provided to the edge computing device at the quantum hardware provider location. The edge computing device may automatically transport the results to a secure storage service of the service provider network, where the customer can access the results using the storage service of the service provider network or via a console of the quantum computing service.

In some embodiments, the results stored to the secure storage service may be seamlessly used by other services integrated into the service provider network, such as a machine learning service, a database service, an object-based storage service, a block-storage service, a data presentation service (that reformats the results into a more usable configuration), etc. For example, in some embodiments, a machine learning service may be used to optimize a quantum algorithm or quantum circuit. For example, the machine learning service may cause various versions of a quantum algorithm or quantum circuit to be run on a quantum computer via a quantum computing service. The machine learning service may also be provided access to results of running the quantum algorithms or quantum circuits. In some embodiments, the machine learning service may cause the quantum algorithms or quantum circuits to be run on various different quantum computing technology based quantum computers. Based on the results, the machine learning service may determine one or more optimizations to improve the quantum algorithms or quantum circuits.

In some embodiments, a quantum computing service may support creating snapshots of results of executing a quantum circuit. For example, the quantum computing service may store snapshots of intermediate results of a hybrid algorithm or may more generally store snapshots of any results generated by executing a quantum circuit on a quantum computer. In some embodiments, an edge computing device at a hardware provider location may temporarily store results and may create snapshot copies of results stored on the edge computing device. The edge computing device may further cause the snapshot copies to be stored in an object-based data storage service of the service provider network. In some embodiments, snapshotting may not be performed, based on customer preferences.

Figure 6:
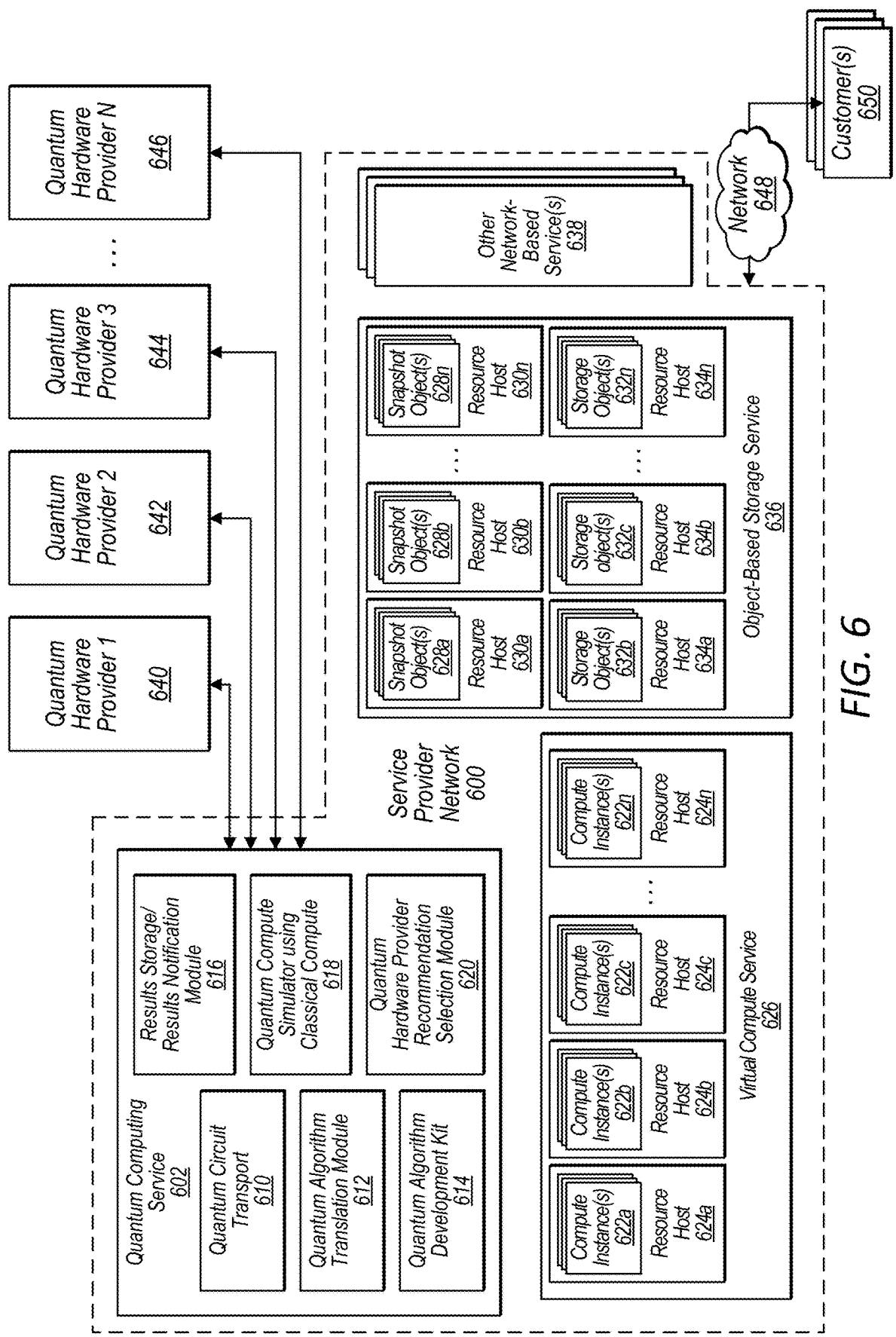
FIG. 6 illustrates a service provider network comprising a quantum computing service, virtual computing service, and storage service, wherein the quantum computing service is configured to use compute resources of the computing service to estimate error rates for gates of a submitted quantum circuit using the procedures described herein, according to some embodiments.

FIG. 6 illustrates a service provider network comprising a quantum computing service, virtual computing service, and storage service, according to some embodiments.

Service provider network 600 may be set up by an entity such as a company or a public sector organization to provide one or more services (such as various types of cloud-based computing or storage) accessible via the Internet and/or other networks to customers 650. Service provider network 600 may include numerous data centers (such as the data centers and network spines) hosting various pools of resource hosts, such as collections of physical and/or virtualized computer servers, storage devices, networking equipment and the like (e.g., computing system 700 described below with regard to FIG. 7), needed to implement and distribute the infrastructure and services offered by the service provider network 600. In some embodiments, service provider network 600 may provide computing resources, such as virtual compute service 626, storage services, such as object-based storage service 636 (which may include various storage types such as object/key-value based data stores or various types of database systems), and/or any other type of network-based services 638. Customers 650 may access these various services offered by provider network 600 via network 648. Likewise network-based services may themselves communicate and/or make use of one another to provide different services. For example, computing resources offered to customers 650 in units called "instances," such as virtual or physical compute instances or storage instances, may make use of other resources, such as data stored in object based data storage service 636 for the compute instances 622a, 622b, 622c and 622c.

Service provider network 600 includes quantum computing service 602. In some embodiments, service provider network 600 may include data centers, routers, networking devices, etc., such as of a cloud computing provider network. In some embodiments, customers 650, may be connected to the service provider network 600 in various ways, such as via a logically isolated connection over a public network, via a dedicated private physical connection, not accessible to the public, via a public Internet connection, etc.

In some embodiments, a quantum computing service 602 may include a quantum algorithm development kit 614 and a translation module 612.

Quantum computing service 602 is connected to quantum hardware providers 640, 642, 644, and 646. In some embodiments, quantum hardware providers 640, 642, 644, and 646 may offer access to run quantum objects on quantum computers that operate based on various different types of quantum computing technologies or paradigms, such as based on quantum annealing, ion-trap, superconductive materials, photons, etc.

In some embodiments, quantum computing service 602 includes a back-end API transport module 610. In some embodiments, the back-end API transport module 610 may be primarily implemented on edge computing devices of the quantum computing service that are located at the quantum hardware provider locations. Also, in some embodiments, at least some of the back-end API transport functionality may be implemented on the one or more computing devices of the service provider network that implement the quantum computing service.

Quantum circuits that have been translated by translation module 612 may be provided to back-end API transport module 610 in order for the translated quantum circuits to be transported to a quantum computer at a respective quantum hardware provider location. In some embodiments, back-end API transport 610 may be a non-public API that is accessible by an edge computing device of service provider network 600, but that is not publicly available. In some embodiments, edge computing devices at the quantum hardware providers 640, 642, 644, and 646 may periodically ping a quantum computer service side interface to the back-end API transport 610 to determine if there are any quantum circuits waiting to be transported to the edge computing device. If so, the edge computing device may perform an API call to the back-end API transport 610 to cause the quantum circuit to be transported over a private connection to the edge computing device and scheduled for execution on a quantum computer. In some embodiments, the edge computing device may queue the quantum circuit for execution on a quantum computer of the quantum hardware provider where the edge computing device is located. Also, the edge computing device may have been configured with a quantum machine image that enables the edge computing device to interface with a scheduling application of the quantum hardware provider, where the edge computing device is located, in order to schedule a time slot on the quantum computer of the quantum hardware provider to execute the quantum circuit via the back-end API transport 610.

In some embodiments, results of executing the quantum circuit on the quantum computer at the quantum hardware provider location may be returned to the edge computing device at the quantum hardware provider location. The edge computing device and/or quantum computing service 602 may cause the results to be stored in a data storage system of the service provider network 600. In some embodiments, results storage/results notification module 616 may coordinate storing results and may notify a customer, such as customer 650, that the results are ready from the execution of the customer's quantum object, such as a quantum task, quantum algorithm, or quantum circuit. In some embodiments, results storage/results notification module 616 may cause storage space in a data storage service to be allocated to a customer to store the customer's results. Also, the results storage/results notification module 616 may specify access restrictions for viewing the customer's results in accordance with customer preferences.

In some embodiments, quantum compute simulator using classical hardware 618 of quantum computing service 602, may be used to simulate a quantum algorithm or quantum circuit using classical hardware. For example, one or more virtual machines of a virtual computing service, such as virtual computing service 626, may be instantiated to process a quantum algorithm or quantum circuit simulation job. In some embodiments, quantum compute simulator using classical hardware 618 may fully manage compute instances that perform quantum circuit simulation. For example, in some embodiments, a customer may submit a quantum circuit to be simulated and quantum compute simulator using classical hardware 618 may determine resources needed to perform the simulation job, reserve the resources, configure the resources, etc. In some embodiments, quantum compute simulator using classical hardware 618 may include one or more "warm" simulators that are pre-configured simulators such that they are ready to perform a simulation job without a delay typically involved in reserving resources and configuring the resources to perform simulation.

In some embodiments, quantum computing service 602 includes quantum hardware provider recommendation/selection module 620. In some embodiments, quantum hardware recommendation/selection module 620 may make a recommendation to a quantum computing service customer as to which type of quantum computer or which quantum hardware provider to use to execute a quantum object submitted by the customer. Additionally, or alternatively, the quantum hardware provider recommendation/selection module 620 may receive a customer selection of a quantum computer type and/or quantum hardware provider to use to execute the customer's quantum object, such as a quantum task, quantum algorithm, quantum circuit, etc. submitted by the customer or otherwise defined with customer input.

In some embodiments, a recommendation provided by quantum hardware provider recommendation/selection module 620 may be based on one or more characteristics of a quantum object submitted by a customer and one or more characteristics of the quantum hardware providers supported by the quantum computing service 102, such as one or more of quantum hardware providers 640, 642, 644, and 646. In some embodiments, quantum computing service may model error probabilities of gates of a quantum circuit, using the techniques described herein, to make a recommendation. For example, the various considerations discussed in FIG. 4 may be reported as part of the recommendation and/or may be used to recommend improvements to a submitted quantum circuit to reduce logical errors resulting from gate errors, as an example.

In some embodiments, quantum hardware provider recommendation/selection module may make a recommendation based on known data about previously executed quantum objects similar to the quantum object submitted by the customer. For example, quantum computing service 602 may store certain amounts of metadata about executed quantum objects and use such metadata to make recommendations. In some embodiments, a recommendation may include an estimated cost to perform the quantum computing task by each of the first and second quantum hardware providers. In some embodiments, a recommendation may include an estimated error rate for each of the first and second quantum hardware providers in regard to performing the quantum computing task. In some embodiments, a recommendation may include an estimated length of time to execute the quantum computing task for each of the first and second quantum hardware providers. In some embodiments, a recommendation may include various other types of information relating to one or more quantum hardware providers or any combination of the above.

In some embodiments, quantum compute simulator using classical hardware 618, may allow a customer to simulate one or more particular quantum computing technology environments. For example, a customer may simulate a quantum circuit in an annealing quantum computing environment and an ion trap quantum computing environment to determine simulated error rates. The customer may then use this information to make a selection of a quantum hardware provider to use to execute the customer's quantum circuit.

As noted above, virtual compute service 626 may offer various compute instances to customers 650. In some embodiments, some such compute instances may be instantiated on an edge computing device located at a quantum hardware provider location. For example, in some embodiments, one or more of resource hosts 624a, 624b, 624c, or 624n may be an edge computing device located at a quantum hardware provider location, such as a location of quantum hardware providers 640, 642, 644, and/or 646. Additionally, a virtual compute instance (e.g. virtual machine) may, for example, be implemented on one or more resource hosts 624 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 626 in different embodiments, including special purpose computer servers, storage devices, network devices and the like, such as edge computing devices located at a quantum hardware provider location. In some embodiments instance customers 650 or any other user may be configured (and/or authorized) to direct network traffic to a compute instance. In various embodiments, compute instances may attach or map to one or more data volumes provided by a block-based storage service in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the customer 650 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. and (in the case of reserved compute instances) reservation term length.

In some embodiments, an object-based storage service, such as object-based storage service 636, may include a plurality of resource hosts that store snapshot objects and/or other storage objects. For example, object-based storage service 636 includes resource hosts 630a and 630b through 630n storing snapshot objects 628a and 628b through 628n. Additionally, object-based storage service 636 includes resource hosts 634a and 634b through 634n storing storage objects 632a and 632b through 632n. For ease of illustration, snapshot objects 628 and storage objects 632 are illustrated as being stored on different resource hosts of object-based storage service 636. However, in some embodiments a same resource host of an object-based storage service, such as a resource host 630 of object-based storage service 636 may store both storage objects and snapshot objects, for example from a snapshot taken of intermediate results of execution of a hybrid algorithm, from final results from the execution of a of quantum computing object, or from a machine image used by a target volume of a block-based storage service to boot a compute instance, such as one of compute instances 622. Also, a resource host 630 of object-based storage service 636 may store one or more quantum machine images used to boot a compute instance at an edge computing device that coordinates scheduling execution of quantum objects on quantum computer at a quantum hardware provider location where the edge computing device is located.

In addition, service provider network 600 may implement other network-based services 638, which may include various different types of analytical, computational, storage, or other network-based system allowing customers 650, as well as other services of provider network 600 (e.g., a block-based storage service, virtual compute service 626 and/or object-based storage service 636) to perform or request various tasks.

Customers 650 may encompass any type of client configurable to submit requests to network provider 600. For example, a given customer 650 may include a suitable version of a web browser, or may include a plug-in module or other type of code module configured to execute as an extension to or within an execution environment provided by a web browser. Alternatively, a customer 650 may encompass an application such as a database application (or user interface thereof), a media application, an office application or any other application that may make use of compute instances 622, quantum compute service 602, or other network-based service in provider network 600 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers 650 may be configured to generate network-based services requests according to a Representational State Transfer (REST)-style network-based services architecture, a document- or message-based network-based services architecture, or another suitable network-based services architecture. In some embodiments, a customer 650 (e.g., a computational client) may be configured to provide access to a compute instance 622 or data storage object 632 in a manner that is transparent to applications implemented on the customer 650 utilizing computational resources provided by the compute instance 622 or storage provided by the storage object 632.

Customers 650 may convey network-based services requests to service provider network 600 via external network 648. In various embodiments, external network 648 may encompass any suitable combination of networking hardware and protocols necessary to establish network-based communications between customers 650 and service provider network 600. For example, a network 648 may generally encompass the various telecommunications networks and service providers that collectively implement the Internet. A network 648 may also include private networks such as local area networks (LANs) or wide area networks (WANs) as well as public or private wireless networks. For example, both a given customer 650 and service provider network 600 may be respectively provisioned within enterprises having their own internal networks. In such an embodiment, a network 648 may include the hardware (e.g., modems, routers, switches, load balancers, proxy servers, etc.) and software (e.g., protocol stacks, accounting software, firewall/security software, etc.) necessary to establish a networking link between given customer 650 and the Internet as well as between the Internet and service provider network 600. It is noted that in some embodiments, customers 350 may communicate with service provider network 600 using a private network rather than the public Internet, such as a direct connection.

Illustrative Computer System

Figure 7:
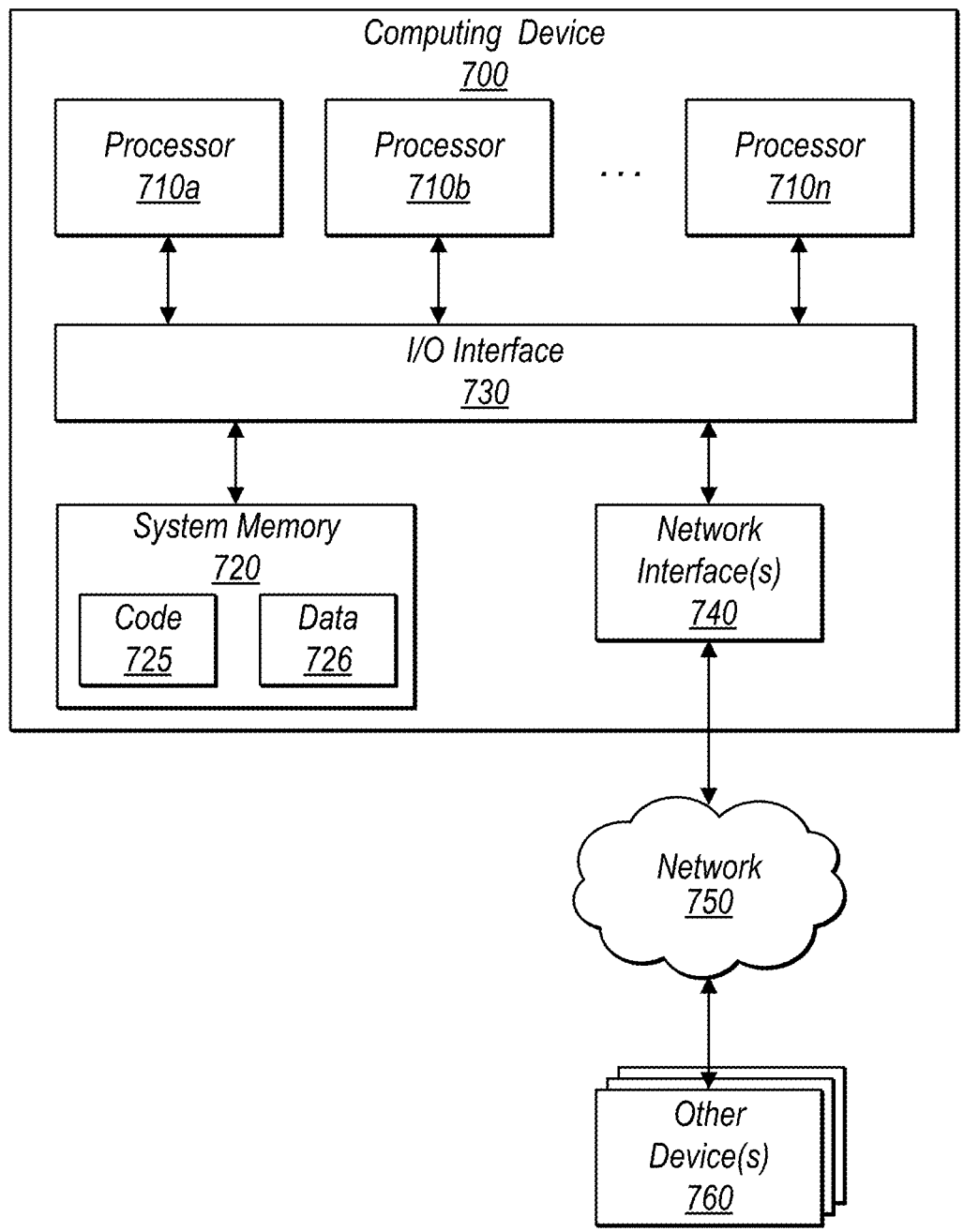
FIG. 7 is a block diagram illustrating an example computing device that may be used in at least some embodiments.

FIG. 7 is a block diagram illustrating an example computing device that may be used in at least some embodiments.

FIG. 7 illustrates such a general-purpose computing device 700 as may be used in any of the embodiments described herein. In the illustrated embodiment, computing device 700 includes one or more processors 710 coupled to a system memory 720 (which may comprise both non-volatile and volatile memory modules) via an input/output (I/O) interface 730. Computing device 700 further includes a network interface 740 coupled to I/O interface 730.

In various embodiments, computing device 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA. In some implementations, graphics processing units (GPUs) may be used instead of, or in addition to, conventional processors.

System memory 720 may be configured to store instructions and data accessible by processor(s) 710. In at least some embodiments, the system memory 720 may comprise both volatile and non-volatile portions; in other embodiments, only volatile memory may be used. In various embodiments, the volatile portion of system memory 720 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 720 as code 725 and data 726.

In some embodiments, I/O interface 730 may be configured to coordinate I/O traffic between processor 710, system memory 720, and any peripheral devices in the device, including network interface 740 or other peripheral interfaces such as various types of persistent and/or volatile storage devices. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other devices 760 attached to a network or networks 750, such as other computer systems or devices as illustrated in FIG. 1 through FIG. 6, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may represent one embodiment of a computer-accessible medium configured to store at least a subset of program instructions and data used for implementing the methods and apparatus discussed in the context of FIG. 1 through FIG. 6. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 740. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a quantum circuit comprising a plurality of quantum gates; and
a computing device comprising:
a memory storing program instructions; and
one or more processors, wherein the program instruction when executed on or across the one or more processors, cause the one or more processors to:
determine Pauli channels for the quantum gates of the quantum circuit;
cause a Pauli twirl to be applied to the quantum gates of the quantum circuit such that the quantum gates are limited in that the quantum gates are subject to noise which is in a Pauli channel;
apply respective eigenstates having eigenvalues of +1 or −1 to the Pauli channels corresponding to the respective quantum gates via Pauli operators ($P_a$) of selected ones of the Pauli channels corresponding to the respective quantum gates;
measure outputs of the Pauli channels in a basis state $P_{a1}$;
determine an overall eigenvalue for quantum circuit based on an average of the measured outputs of the respective Pauli channels, wherein the overall eigenvalue for the quantum circuit is a product of the eigenvalues of the respective quantum gates of the quantum circuit;
determine eigenvalues for the respective quantum gates by solving a system of equations using the determined overall eigenvalue for the quantum circuit and the measured outputs and by applying a logarithm to enable the system of equations to be solved using a linear estimation or other linear system of equations solution; and
determine Pauli error rates for the respective quantum gates of the quantum circuit using the determined eigenvalues for the respective quantum gates of the quantum circuit.

2. The system of claim 1, wherein the determined Pauli channels for the quantum gates of the quantum circuit represent a model of incoherent noise for the quantum gates of the quantum circuit.

3. The system of claim 2, wherein the program instructions, when executed on or across the one or more processors, further cause the one or more processors to:
determine another set of Pauli channels for the quantum gates of the quantum circuit, wherein the other set of Pauli channels represent another model of incoherent noise for the quantum gates of the quantum circuit;
perform said causing a Pauli twirl, said applying eigenstates, said measuring outputs, and said determining another overall eigenvalue for the other set of Pauli channels;
determine other eigenvalues for the respective quantum gates by solving another system of equations according to the other model using the other determined overall eigenvalue for the quantum circuit and the other measured outputs; and
determine Pauli error rates for the respective quantum gates of the quantum circuit according to the other model using the other determined eigenvalues for the respective quantum gates of the quantum circuit.

4. The system of claim 3, wherein the computing device is configured to estimate the error rates for the respective quantum gates of the quantum circuit according to the model and the other model in parallel.

5. The system of claim 4, wherein for Pauli channels that are equivalent in the model and the other model, corresponding measured outputs are used to estimate the eigenvalues for the respective models without having to repeat the measurements for the equivalent Pauli channels.

6. The system of claim 1, wherein the program instructions, wherein the computing device is further configured to:
perform a fault tolerance simulation using the determined Pauli error rates for the respective quantum gates of the quantum circuit;
perform an error simulation for the quantum gates of the quantum circuit using the determined Pauli error rates for the respective quantum gates of the quantum circuit;
modify a decoding map for the quantum circuit to take into account the determined Pauli error rates for the respective quantum gates of the quantum circuit;
modify a compiling algorithm for the quantum circuit to reduce error propagation based on the determined Pauli error rates for the respective quantum gates of the quantum circuit; or
perform error mitigation to account for the determined Pauli error rates when performing other quantum computations.

7. A method, comprising:
twirling noise channels into a standard form for individual gates of a quantum circuit;
sampling the noise channels using inputs that have a property such that the inputs are eigenoperators of the noise channels;
estimating an overall eigenvalue for the quantum circuit based on results of the sampling of the noise channels; and
producing a model for the noise behavior of the individual gates by estimating individual eigenvalues for the individual gates of the quantum circuit based on the results of the sampling of the noise channels and the estimated overall eigenvalue for the quantum circuit, wherein applying a logarithm to respective equations of a system of equations representing respective relationships between the individual eigenvalues of the gates of the quantum circuit and the overall eigenvalue for the quantum circuit enables estimation of the individual eigenvalue via linear estimation or linear regression.

8. The method of claim 7, wherein producing the model further comprises:
determining Pauli error rates for the respective quantum gates of the quantum circuit using the determined eigenvalues for the respective quantum gates of the quantum circuit.

9. The method of claim 7, wherein the quantum gates of the quantum circuit are Clifford gates.

10. The method of claim 7, wherein the noise channels are Pauli channels for the quantum gates of the quantum circuit and wherein the model represents a model of incoherent noise for the quantum gates of the quantum circuit.

11. The method of 10, wherein the model accounts for space-correlated errors and/or time-correlated errors.

12. The method of claim 10, wherein the model accounts for state preparation and measurement errors.

13. The method of claim 7, further comprising:
inserting a regularizer term in the system of equations prior to solving the system of equations, wherein the regularizer term reduces overfitting of the model.

14. One or more non-transitory, computer-readable, media storing program instruction, that when executed on or across one or more processors, cause the one or more processors to:

cause a Pauli twirl to be applied to quantum gates of a quantum circuit such that the quantum gates are limited in that the quantum gates are subject to noise which is in a Pauli channel;

apply respective eigenstates having eigenvalues of +1 or −1 to the Pauli channels corresponding to the respective quantum gates via Pauli operators ($P_a$) of selected ones of the Pauli channels corresponding to the respective quantum gates;

receive measurement outputs of the Pauli channels in a basis state $P_{a1}$;

determine an overall eigenvalue for quantum circuit based on an average of the measured outputs of the respective Pauli channels; and produce a model by solving a system of equations to determine eigenvalues for the respective quantum gates using the determined overall eigenvalue for the quantum circuit and the measured outputs, wherein solving the system of equations comprises applying a logarithm to enable the system of equations to be solved using a linear estimation or other linear system of equations solution.

15. The one or more non-transitory, computer-readable media of claim 14, wherein to produce the model the program instructions, when executed on or across the one or more processors, further cause the one or more processors to:

determine Pauli error rates for the respective quantum gates of the quantum circuit using the determined eigenvalues for the respective quantum gates of the quantum circuit.

16. The one or more non-transitory, computer-readable media of claim 14, wherein the model represent a model of incoherent noise for the quantum gates of the quantum circuit.

17. The one or more non-transitory, computer readable media of claim 16, wherein the program instructions, when executed on or across the one or more processors, further cause the one or more processors to:

determine another set of Pauli channels for the quantum gates of the quantum circuit, wherein the other set of Pauli channels represent another model of incoherent noise for the quantum gates of the quantum circuit;

solve another system of equations to determine other eigenvalues for the respective quantum gates according to the other model using the determined overall eigenvalue for the quantum circuit and the measured outputs; and determine Pauli error rates for the respective quantum gates of the quantum circuit according to the other model using the other determined eigenvalues for the respective quantum gates of the quantum circuit.

18. The one or more non-transitory, computer readable media of claim 17, wherein the program instructions, when executed on or across the one or more processors, further cause the one or more processors to:

re-use the measurement outputs and the overall determined eigenvalue for the circuit to generate the other system of equations for the other model.

19. The one or more non-transitory, computer readable media of claim 18, wherein the program instructions, when executed on or across the one or more processors, further cause the one or more processors to:

perform said causing a Pauli twirl, said applying eigenstates, said measuring for other outputs, and said determining another overall determined eigenvalue;

wherein the other system of equations further includes equations generated using the other measurement outputs and the other overall determined eigenvalue.

20. The one or more non-transitory, computer readable media of claim 19, wherein the program instructions, when executed on or across the one or more processors, further cause the one or more processors to:

estimate the error rates for the respective quantum gates of the quantum circuit according to the model and the other model in parallel.

\* \* \* \* \*